US012773670B2

(12) United States Patent
Kondziela

(10) Patent No.: US 12,773,670 B2
(45) Date of Patent: Oct. 27, 2026

(54) STATIC MIXER FOR IMPRESSION MATERIALS

(71) Applicant: KULZER GMBH, Hanau (DE)

(72) Inventor: Mike Kondziela, Weilburg (DE)

(73) Assignee: Kulzer GmbH, Hanau (DE)

( * ) Notice: Subject to any disclaimer, the term of this patent is extended or adjusted under 35 U.S.C. 154(b) by 463 days.

(21) Appl. No.: 18/279,109

(22) PCT Filed: Mar. 2, 2022

(86) PCT No.: PCT/EP2022/055213
§ 371 (c)(1),
(2) Date: Aug. 28, 2023

(87) PCT Pub. No.: WO2022/184749
PCT Pub. Date: Sep. 9, 2022

(65) Prior Publication Data

US 2024/0139695 A1 May 2, 2024

(30) Foreign Application Priority Data

Mar. 5, 2021 (DE) ..................... 10 2021 105 414.1

(51) Int. Cl.
*B01F 25/431* (2022.01)
*A61C 9/00* (2006.01)
(Continued)

(52) U.S. Cl.
CPC ...... *B01F 25/43161* (2022.01); *A61C 9/0026* (2013.01); *B01F 2101/19* (2022.01); (Continued)

(58) Field of Classification Search
CPC ............. A01C 9/0026; B01F 25/43161; B01F 2101/19; B01F 25/4316; B01F 25/431972
See application file for complete search history.

(56) References Cited

U.S. PATENT DOCUMENTS 5,851,067 A 12/1998 Fleischli et al.
2021/0154628 A1* 5/2021 Bublewitz ........... B01F 25/4321

FOREIGN PATENT DOCUMENTS

DE 10158651 A1 6/2003
DE 102017117198 A1 1/2019
WO 2022/184749 A1 9/2022

OTHER PUBLICATIONS

Second Page of German Office Action, corresponding to German Application No. 10 2021 105 414.1.
(Continued)

*Primary Examiner* — Elizabeth Insler
(74) *Attorney, Agent, or Firm* — Norris McLaughlin, P.A.

(57) ABSTRACT

Mixing elements for static mixer utilizing mixing low- to high-viscosity components are provided and comprise a planar central part extending along a longitudinal axis L and having front and rear faces, wherein arranged on the front and/or rear face are at least two flow-influencing elements that each surround at least one through-opening located in the central part and that are each in the form of prism lateral surfaces that are substantially perpendicular to the front and/or rear face, wherein pairs of the elements overlap or are connected to one another at a lateral edge. Static mixers comprising the mixing element and methods for mixing low- to high-viscosity components with the static mixers are also provided.

14 Claims, 7 Drawing Sheets

Figure 1A:
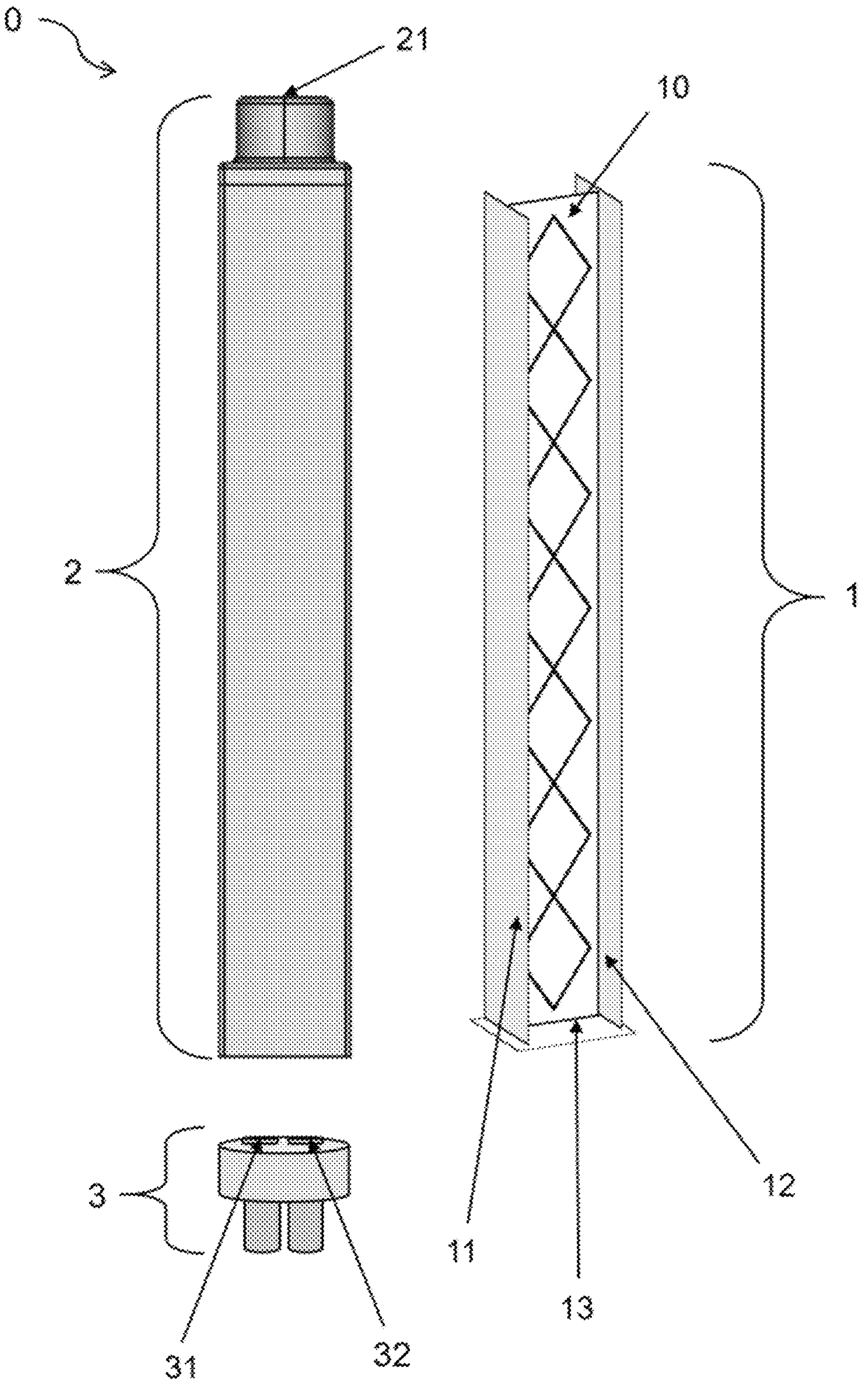

(51) Int. Cl.
*B01F 101/00* (2022.01)
*B01F 101/19* (2022.01)

(52) U.S. Cl.
CPC ................. *B01F 2101/2305* (2022.01); *B01F 2215/0422* (2013.01)

(56) References Cited

OTHER PUBLICATIONS

English translation of International Search Report dated Jun. 14, 2022, issued in connection with PCT International Application No. PCT/EP2022/055213.
International Search Report dated Jun. 14, 2022, issued in connection with PCT International Application No. PCT/EP2022/055213.
Written Opinion in connection with PCT International Application No. PCT/EP2022/055213.

* cited by examiner

STATIC MIXER FOR IMPRESSION MATERIALS

This application is a 371 of International Patent Application No. PCT/EP2022/055213, filed Mar. 2, 2022, which claims foreign priority benefit under 35 U.S.C. § 119 of the German Patent Application No. 10 2021 105 414.1, filed Mar. 5, 2021, the disclosures of which are incorporated herein by reference.

An object of the invention is a mixing element for a static mixer, in particular a dental static mixer, for mixing low- to high-viscosity components, comprising a flat middle part extending along a longitudinal axis L and having a front side and a rear side opposite the front side, wherein at least two flow-influencing elements are arranged on the front side and/or on the rear side of the middle part, which in each case enclose at least one passage opening located in the middle part and having the form of rotation bodyprism shells, in particular based on an orthodiagonal quadrilateral, which are located essentially perpendicularly on the front side and/or the rear side and which overlap or are connected to one another in pairs, in each case at one side edge. Furthermore, it is an object of the invention to provide a static mixer, in particular a dental static mixer, comprising the mixing element as well as its use for mixing low to high viscosity components.

In mixing processes, the constituents of at least two separate mixture components are repositioned by relative movement in such a way that a new arrangement scheme in the form of a mixture is created. Depending on the consistency of the components to be mixed, static or dynamic mixers are used. While rotating mixing elements are used in a dynamic mixer to homogenize the respective components, in static mixing they are mixed by their flow movement alone. This is done by static flow influencing elements inside a static mixer, which divide, swirl and recombine the respective components.

Such mixers are used, among other things, in the dental sector for mixing components that react with each other, in particular polymerizing components, such as for homogenizing the two paste components "cat" (catalyst paste) and "base" (base paste) in the manual application of dental impression materials. For this purpose, the paste streams are combined several times and divided into individual strands again until a homogeneous mixed material is obtained.

In the prior art, static mixers with helical mixing elements are primarily known, in which the helix is interrupted several times to divide and combine the paste streams. Newer static mixers, on the other hand, have mixing chambers that lie longitudinally and transversely to the direction of flow and are connected to one another, thus ensuring good mixing performance through multiple division and merging of the paste streams.

For example, DE 10 2017 117 198 A1 discloses a static mixer for mixing pasty and/or flowable components, in which these components flow through cuboid chambers arranged behind and next to one another along their flow path and connecting with one another via passage openings. The corresponding chambers are defined by transverse walls extending transversely to the direction of flow and side walls extending parallel to the direction of flow and are in flow connection with one another via passage openings provided in the side walls.

However, there is a disadvantage of the geometry proposed in DE 10 2017 117 198 A1 in injection molding mass production, since the cores that can form such cavities and apertures in the injection mold must be of very filigree design. However, this very filigree design means that efficient cooling of the corresponding mold sections is not possible, so that they are subjected to a high continuous thermal load (230° to 300°) during injection molding. As a result, the high-alloy mold steel used to manufacture the corresponding mold sections slowly loses its mechanical properties. In unfavorable cases, mold damage even occurs as a result of the filigree mold sections bursting away, leading to the failure of the mold and production. The use of high-temperature tool steels can delay but not prevent this effect, so the only solution to this problem at present is slower process control with a prolonged cooling phase. However, this makes the manufacturing process significantly less economical and results in the loss of production capacity.

There is therefore a need to provide a static mixer with a mixing element which—despite mixing chambers arranged longitudinally and transversely to the direction of flow—avoids the aforementioned disadvantage.

Task of the present invention is therefore to provide a mixing element for a static mixer exhibiting mixing chambers arranged longitudinally and transversely to the direction of flow with a simple structure. In particular, the aim is to provide a mixing element that can be manufactured economically by injection molding and that permits the use of injection molds with good temperature control. Furthermore, the mixing element should enable improved mixing of at least two low- to high-viscosity components, in particular dental materials. In addition, a task is to provide a mixing element and a static mixer whose small extension in the longitudinal direction avoids unnecessary shearing of the components to be mixed and a restriction of the field of vision during application in the oral cavity of a patient.

The tasks of the present invention are solved by a mixing element according to claim 1 and a static mixer according to claim 12, comprising the mixing element, and by the use of the static mixer according to claim 14. Preferred embodiments of the invention are disclosed in detail in the subclaims as well as in the description.

According to the invention, the tasks of the present invention are solved in that the flow-influencing elements of the mixing element according to the invention having the form of prism shells standing essentially perpendicularly on the front side and/or the rear side of the mixing element, in particular prism shells based on an orthodiagonal quadrilateral, preferably based on a kite quadrilateral, particularly preferably a rhombus, which overlap or are connected to one another in pairs at one side edge each. In the context of the present invention, prism shells, whose positioning on the front and/or rear side does not deviate or deviates only slightly from a 90° angle are considered to be substantially perpendicular to the front and/or rear side of the mixing element. This is the case if at least their side surfaces are substantially perpendicular to the front or rear side. The side surfaces of the prism shells therefore preferably have a 90° angle plus/minus 5°, preferably plus/minus 3°, particularly preferably plus/minus 0.5°, with the front side and/or rear side of the mixing element. In particular, the flow-influencing elements of the mixing element according to the invention have the form of prism coats standing at a 90° angle plus/minus 5°, preferably plus/minus 3°, particularly preferably plus/minus 0.5°, on the front side and/or the rear side of the mixing element, which coats overlap or are connected to each other in pairs at one side edge each.

The flow-influencing elements thus form, in particular together with the inner walls of a mixer sleeve of a static mixer, geometric, preferably diamond-shaped, mixing chambers which are arranged one behind the other in relation to the flow path of the components to be mixed and are tapered towards their respective transitions into one another.

The election of such a mixing chamber geometry has the advantage that the component streams to be mixed are inevitably backed up at the transitions of the mixing chambers into each other, which are designed as bottlenecks. The backpressure thus formed in the respective mixing chambers causes the corresponding component flow to be split, since a partial flow is directed through an opening in the front side or rear side of the mixing element in the region of the bottleneck to the parallel component flow and is swirled with the latter, while the other partial flow continues its flow path. By repeating this process in each of the mixing chambers of the mixing element according to the invention, an optimum mixing of the corresponding material, in particular dental material, is thus achieved. Furthermore, due to its simple design, the mixing element according to the invention enables extremely economical production by means of injection molding. The required injection molds can be sufficiently tempered, so that the risk of mold damage and production downtime is significantly reduced.

In the context of the present invention, a prism shell is generally understood to be the shell of a three-dimensional body, i.e. without base surface and top surface. This can, similar to a rotation body, consist of a continuous curved surface or, similar to a prism, be composed of several, in particular polygonal, surfaces. Preferably, a prism shell according to the invention consists of at least three, in particular at least four, polygonal surfaces, each of which forms the lateral edges of the prism shell by meeting in pairs. In this sense, a preferred prism shell has at least three, in particular at least four, optionally rounded, side edges. These may, but need not, be arranged perpendicular to the imaginary base surface and/or the imaginary cover surface. Therefore, a prism shell in which the imaginary base surface and the imaginary cover surface do not coincide with respect to their shape and/or size and in which the imaginary cover surface is horizontally displaced with respect to the imaginary base surface is also considered to be according to the invention. Furthermore, the imaginary cover surface needs not necessarily be parallel to the imaginary base surface.

The base of the prism shells according to the invention is in each case the imaginary base surface, which preferably has the shape of an orthodiagonal quadrilateral, in particular an orthodiagonal quadrilateral with rounded corners. By an orthodiagonal quadrilateral is meant a quadrilateral in which the diagonals cross at right angles, or in other words, a quadrilateral in which for the two pairs of opposite sides the sums of the squares of the side lengths coincide.

Particularly preferred orthodiagonal quadrilaterals as the basis of the prism shells according to the invention are kite quadrilaterals, in particular with rounded corners, preferably rhombuses, in particular with rounded corners. A kite quadrilateral (also deltoid) is a planar quadrilateral in which a diagonal is the axis of symmetry or which has two pairs of adjacent sides of equal length. A special dragon quadrilateral is the rhombus, namely an equilateral deltoid. Consequently, a rhombus is a plane quadrilateral with four sides of equal length, where opposite sides are parallel and opposite angles are equal.

The respective side faces forming the prism shells according to the invention may have a polygonal shape, i.e. the shape of a polygon. Polygonals preferred according to the invention comprise convex polygons, in particular convex quadrilaterals. Preferably, the side faces of the prism shells according to the invention are in the form of trapezoids, that is, quadrilaterals with two sides parallel to each other. Depending on whether the imaginary base surface and the imaginary top surface are parallel to one another and/or displaced and/or congruent in the corresponding prism shells, the respective side surfaces can have different manifestations of convex quadrilaterals, in particular trapezoids. Thus, the side surfaces of the prism shells according to the invention are preferably rectangles if the imaginary base surface and the imaginary cover surface are congruent to each other, parallel and not displaced, and parallelograms if the imaginary base surface and the imaginary cover surface are congruent to each other and parallel, but displaced in the horizontal direction. Otherwise, that is, when the imaginary base surface and the imaginary top surface are not congruent and/or not parallel to each other, they are trapezoids. The side surfaces of the prism shells according to the invention can be planar as well as curved.

Thus, it is an object of the invention to provide a mixing element for a static mixer, in particular a dental static mixer, for mixing low- to high-viscosity components, comprising a flat middle part extending along a longitudinal axis L and having a front side and a rear side opposite the front side, wherein at least two flow-influencing elements, in particular at least two to 20, preferably at least three to ten, such as 4, 5, 6, 7, 8, 9, flow-influencing elements, which in each case enclose at least one, in particular at least two, passage opening(s) located in the middle part, are arranged, and the flow-influencing elements having the form of prism shells, in particular based on an orthodiagonal quadrilateral, preferably based on a rhombus, which stands essentially perpendicularly on the front side and/or on the rear side and which overlap or are connected to one another in pairs, in each case at one side edge.

The middle part of the mixing element according to the invention represents a partition between the flow-influencing elements located on the front side of the mixing element and the flow-influencing elements located on the rear side of the mixing element, thus separating the component flow flowing along the front side from the component flowing along the rear side. Preferably, the middle part has a height of greater than or equal to 10 mm to less than or equal to 100 mm, preferably greater than or equal to 40 mm to less than or equal to 70 mm, particularly preferably greater than or equal to 50 mm to less than or equal to 60 mm, measured along the longitudinal axis L, and/or a width of greater than or equal to 2 mm to less than or equal to 10 mm, preferably greater than or equal to 4 mm to less than or equal to 6 mm, particularly preferably by 5 mm, measured perpendicular to the longitudinal axis L. In this case, the thickness of the middle part is preferably greater than or equal to 1 mm to less than or equal to 10 mm, preferably greater than or equal to 4 mm to less than or equal to 6 mm.

The middle part according to the invention has a plurality of passage openings through which the component streams flowing separately along the front side and the rear side of the middle part can at least partially reach the respective other side of the middle part and mix there. Accordingly, the middle part has a total of at least two, preferably at least two to 50, in particular at least five to 40, passage openings to connect the front side of the middle part to the rear side of the middle part (and vice versa). The at least two through-openings may have any two-dimensional shape in cross-section such as, in each case independently of one another, circle, ellipse, rectangle, square and/or triangle. In this case, the area of the cross section of the at least two through-openings is preferably, in each case independently of one another, greater than or equal to 0.1 $mm^2$ to less than or equal to 3.0 $mm^2$, preferably greater than or equal to 0.5 $mm^2$ to less than or equal to 2.5 $mm^2$, particularly preferably 1.0±0.25 $mm^2$, in particular 0.78 $mm^2$. In addition, it may be preferred if the area of the cross-section of a passage opening on the front side of the middle part differs from the area of the cross-section of a passage opening on the rear side of the middle part, for example, in order to allow one component flow to pass from the front side to the rear side, but not the other component flow from the rear side to the front side (and vice versa). The arrangement of the passage openings depends on the flow influencing elements arranged on the front and/or rear side of the center part.

Thus, the at least two flow-influencing elements arranged on the front side and/or on the rear side of the middle part each enclose at least one, in particular at least two, through-openings, i.e. these are located inside and thus in the imaginary base area of the respective prism shell, preferably being oriented closer to the respective side edges overlapping or connected in pairs than to the center of the respective flow-influencing element. Preferably, no passage openings are located outside the areas enclosed by the flow influencing elements. This ensures that a component flow located in a mixing chamber formed by a flow-influencing element comes out again in a mixing chamber formed by a flow-influencing element, but on the other side of the middle part.

According to the invention, the flow-influencing elements are in the form of prism shells standing essentially perpendicular to the front side and/or the rear side, in particular at a 90° angle plus/minus 5°, preferably plus/minus 3°, particularly preferably plus/minus 0.5°, in particular on the basis of an orthodiagonal quadrilateral. In the context of the aforementioned definition of a prism shell according to the invention, the latter is considered to be substantially perpendicular to the front side and/or the rear side if at least its side faces are substantially perpendicular to the front side and/or the rear side. This needs not necessarily also apply to the side edges of the prism shell. In this sense, the imaginary base surface of the prism shells is represented in each case by a part of the front side or rear side of the middle part. The imaginary top surface, on the other hand, is represented only when the mixing element according to the invention is received in the mixer sleeve of a static mixer, namely by the inner walls of the mixer sleeve.

Preferred flow-influencing elements have the form of a prism shell based on a kite quadrilateral, in particular based on a rhombus, preferably an elongated rhombus. Thereby, according to the invention, it is particularly preferred if, in a first embodiment of the mixing element according to the invention, the flow-influencing elements have the form of prism shells based on a rhombus, in particular an elongated rhombus, in which the imaginary base surface and the imaginary top surface are congruent in the shape of a rhombus, parallel and not displaced, while in a second embodiment of the mixing element according to the invention, the flow-influencing elements have the form of prism shells based on a rhombus, in particular an elongated rhombus, in which the imaginary base surface and the imaginary cover surface are both rhombus-shaped, but the imaginary cover surface is neither congruent nor parallel to the imaginary base surface. Nevertheless, according to the invention, in both cases the mixing chambers formed by the respective flow-influencing elements are also described as diamond-shaped.

Preferred flow-influencing elements in accordance with the invention, in particular the prism shells serving as a base, thus preferably each have four, optionally rounded, side edges, wherein they overlap or are connected to one another in pairs at one of these side edges in each case. In particular, flow-influencing elements preferred according to the invention meet each other at two of their side edges, in particular at two opposite side edges, with another flow-influencing element preferred according to the invention. In this context, the term "in pairs" refers to the fact that two flow-influencing elements each meet on at least one common side edge. Thus, in the case of three flow influencing elements, the first and second flow influencing elements, as well as the second and third flow influencing elements, and optionally the first and third flow influencing elements, would meet on at least one common side edge. Consequently, the term "in pairs" does not necessarily require the presence of an even number of flow influencing elements.

According to the invention, "overlapping side edges" means that the prism shells concerned are at least partially pushed into one another and do not form a common side edge. In contrast, "interconnected side edges" is understood to mean the formation of a common side edge.

In a preferred embodiment of the present invention, the flow-influencing elements each have a common passage at their side edges which overlap or are connected to one another in pairs. This enables the flow of the component flow located on the front or rear side to flow into the flow influencing element following in the direction of flow. In particular, the common passage is formed by the imaginary nesting of the respective flow-influencing elements while thinking away the respective protruding tips or else in the common side edge of the respective flow-influencing elements. The common passage preferably has an area of greater than or equal to 0.1 $mm^2$ to less than or equal to 2.5 $mm^2$, preferably greater than or equal to 0.5 $mm^2$ to less than or equal to 2.0 $mm^2$, particularly preferably 1.0±0.3 $mm^2$, especially 1.26 $mm^2$.

In a particularly preferred embodiment of the present invention, the side edges of the at least two flow influencing elements, which overlap or are connected to each other in pairs, are arranged on the longitudinal central axis $L_M$ of the middle part. The longitudinal central axis $L_M$ may correspond to an axis of symmetry of the middle part. In this sense, the at least two flow-influencing elements are arranged on the front side and/or on the rear side of the middle part in such a way that their respective opposite side edges, in particular their side edges overlapping in pairs or connected to each other, lie on a common axis, in particular the longitudinal central axis $L_M$ of the middle part. At the same time, the remaining opposite side edges may, but need not, each lie on a common axis coinciding with the longitudinal edges of the middle part.

The flow-influencing elements according to the invention are thus arranged in a row and preferably one behind the other with respect to the flow direction of the components to be mixed. Accordingly, there is a repeated tapering and renewed expansion of the mixing chambers formed by the flow-influencing elements in the direction of flow, which causes the described jamming effect.

The mixing element according to the invention is therefore ideally suited for mixing low- to high-viscosity components, in particular pasty materials, preferably dental materials. Viscosity refers to the viscosity of fluids and is expressed in Pascal seconds (Pa·s). It is divided into three categories: low, medium and high viscosity. The limits between each category are about 300 mPa·s for the transition between low and medium viscosity fluids and about 8000 mPa·s for the transition between medium and high viscosity fluids. The high-viscosity fluids also include, in particular, pasty dental materials, preferably 2-component (2C) impression materials, which are in the form of a base paste and a catalyst paste, which must be homogeneously mixed by the mixing element according to the invention, or the static mixer according to the invention, before they are used.

In a first embodiment of the mixing element according to the invention, the middle part comprising at least two, in particular at least two to 20, preferably at least three to ten, flow-influencing elements arranged on the front side and at least two, in particular at least two to 20, in particular at least three to ten, flow-influencing elements arranged on the rear side, which are at least partially offset with respect to each other in the direction of the longitudinal axis L. In particular, the flow-influencing elements on the front side of the middle part are offset with respect to the flow-influencing elements arranged on the rear side of the middle part with respect to the longitudinal axis L by the length of at least one quarter of a flow-influencing element, preferably at least one third of a flow-influencing element (and vice versa).

Particularly preferably, the flow-influencing elements on the front side and/or the rear side of the middle part are offset from each other by half a flow-influencing element in the direction of the longitudinal axis L. This means that the side edges of the flow-influencing elements on one side of the center part, which overlap or are connected to one another in pairs, are preferably arranged at the height of the respective geometric center of gravity, in particular center point, of the flow-influencing elements on the other side of the middle part (and vice versa). In particular, the side edges of the diamond-shaped flow-influencing elements on the front side of the middle part, which overlap or are connected to one another in pairs, are arranged at the height of the respective center point of the diamond-shaped flow-influencing elements on the rear side of the middle part and/or the side edges of the diamond-shaped flow-influencing elements on the rear side of the middle part, which overlap or are connected to one another in pairs, are arranged at the height of the respective center point of the diamond-shaped flow-influencing elements on the front side of the middle part.

In this context, it may be preferred if the at least two flow-influencing elements arranged on the front side and the at least two flow-influencing elements arranged on the rear side each include at least two passage openings located in the middle part, one passage opening being located in the region, in particular at the bottleneck, of the side edges of the flow-influencing elements, which overlap or are connected to one another in pairs, on the front side, and the other passage opening is arranged in the region, in particular at the bottleneck, of the side edges of the flow-influencing elements, which overlap or are connected to one another in pairs, on the rear side.

In relation to the flow path of the components to be mixed, the passage openings are thus preferably located in each case at the end of a mixing chamber formed by the corresponding flow-influencing element on the front side and/or the rear side, in particular before the transition into the mixing chamber following in the direction of flow. This arrangement enables a more efficient division of the component flows, since due to the backpressure occurring at the transitions of the mixing chambers into each other, a partial flow of the corresponding component flow enters the passage opening located there in each case, but exits the passage opening on the opposite side in a more relaxed (less narrow) region of the correspondingly offset mixing chamber, namely in the region of the geometric center of gravity, in particular center, of the opposite flow-influencing element.

In a second embodiment of the mixing element according to the invention, the middle part is composed of at least two middle part segments, in particular at least two to 20, preferably at least three to ten, such as 4, 5, 6, 7, 8, 9, middle part segments, which are alternately inclined at an angle $\alpha$ to the rear and at an angle $\beta$ to the front in relation to the longitudinal axis L, wherein preferably one flow influencing element each is arranged on the front side and/or on the rear side, in particular one flow influencing element each on the front side and one flow influencing element each on the rear side, of one middle part segment each.

In this sense, the middle part composed of middle part segments describes in profile or its cross-section along the longitudinal axis L a zigzag line in which the middle part segments are each inclined with respect to each other at an angle ($\alpha-\beta$) greater than or equal to 2° to less than or equal to 178°, preferably greater than or equal to 20° to less than or equal to 160°, particularly preferably greater than or equal to 60° to less than or equal to 120°. Consequently, the individual middle part segments alternately meet facing the front side and/or rear side in a tip coming to the front or forming an acute cavity reaching to the rear and two flow-influencing elements each on the front side and on the rear side, respectively, thus either at a tip coming to the front of two middle part segments and thus obtuse or at the end of an acute cavity formed by two middle part segments and thus acute. In both cases, the respective overlapping or interconnected side edges of the adjacent flow influencing elements preferably lie on the bisector of the angle enclosed by the corresponding middle part segments.

The at least two to 20 middle part segments are each connected to one another in pairs, in particular formed in one piece of material, and in their entirety form the middle part of the mixing element according to the invention. The middle part thus continues to extend along the longitudinal axis L, but in this second embodiment, in contrast to the first embodiment of the mixing element according to the invention, it is not of planar design. Instead, the middle part comprises middle part segments alternately inclined at an angle $\alpha$ to the rear and at an angle $\beta$ to the front with respect to the longitudinal axis L. It may be preferred if, independently of one another, the angle $\alpha$ is greater than or equal to 1° to less than or equal to 89°, preferably greater than or equal to 25° to less than or equal to 85°, particularly preferably greater than or equal to 50° to less than or equal to 80°, in particular 75°, preferably with +/−2°, preferably with +/−1°, and/or the angle $\beta$ is less than or equal to −1° to greater than or equal to −89°, preferably less than or equal to −25° to greater than or equal to −85°, particularly preferably less than or equal to −50° to greater than or equal to −80°, particularly 75°, preferably with +/−2°, preferably with +/−1°, with respect to the longitudinal axis L. In particular, the amount of the angle $\alpha$ is equal to the amount of the angle $\beta$.

This particular course of the middle part has the advantage that every second mixing chamber formed by the flow-influencing elements tapers at its transition to the subsequent mixing chamber not only in terms of its width but also in terms of its depth. As a result of this horizontal and vertical reduction in its cross-sectional area in the axial direction of flow, the flow resistance of a corresponding component flow increases in such a way that a partial flow of the component flow passes through the passage opening in the middle part, which is arranged in the region of the transition to the subsequent mixing chamber, into the opposite mixing chamber on the other side of the middle part and mixes with the component flow located there. The remaining mixing chambers, on the other hand, in which, in the opposite direction, instead of tapering, expansion takes place with respect to their depth, allow extensive mixing of component streams that have just been brought together. This effect can be further enhanced by making the common passages at the side edges of the flow-influencing elements, which overlap or are connected to each other in pairs, different in size depending on whether the mixing chamber is tapering or expanding with respect to depth.

Thus, a mixing element of the second embodiment may be particularly preferred according to the invention, in which the flow-influencing elements on the front side and/or rear side of adjacent middle part segments alternately meet one another bluntly or pointedly at their side edges which overlap or are connected to one another in pairs, and the common passage at the side edges, which overlap or are connected to one another in pairs, of two flow-influencing elements which meet one another pointedly is greater than the common passage at the side edges, which overlap or are connected to one another in pairs, of two flow-influencing elements which meet one another bluntly. In particular, the common passage at the side edges of two flow-influencing elements overlapping each other in pairs or connected to each other is at least 1.25 times, preferably at least 1.5 times-, in particular at least twice as large as the common passage at the side edges of two flow-influencing elements—overlapping each other in pairs. The smaller common passage in the case of two flow-influencing elements meeting obtusely increases the flow resistance of the respective component flow in the mixing chambers tapering in relation to depth, while at the same time, in the mixing chambers expanding in relation to depth, the larger common passage of two flow-influencing elements meeting obtusely allows easier mixing and forward flow of the component flows just brought together.

In addition, a crossbar aligned essentially perpendicular to the longitudinal axis L is preferably arranged on the front side and/or on the rear side between two middle part segments in order to stabilize the respective transitions from the individual mixing chambers into one another. In particular, the crossbar has the same width in relation to the longitudinal axis L as the middle part. Thus, preferably, the side edges of the flow-influencing elements which do not overlap or are connected to each other in pairs lie on a common line with the respective end edge of the crossbar. Preferably, the crossbar is joined or integrally formed with the middle part or the associated middle part segments. The crossbar can also be formed by joining two middle part segments.

In a further preferred embodiment of the present invention, which is compatible with both the first embodiment and the second embodiment of the mixing element according to the invention, the mixing element further comprises a first side part and a second side part arranged at a distance from the first side part, the middle part being connected to the first side part and the second side part in such a way that the front side and the rear side are oriented substantially perpendicular to the first side part and/or the second side part. In this sense, the middle part together with the first side portion (left side portion) and the second side portion (right side portion) substantially form the shape of the letter H when viewed from above or from below.

The right and/or left side part may be joined to or integrally formed with the middle part or the middle part segments, and facilitates the uptake of the mixing element according to the invention in the mixer sleeve of a static mixer. In particular, the right and left side portions are provided to abut two opposing inner walls of the mixer sleeve of a static mixer according to the invention. In this sense, it is preferred if the cross-section of the mixing element defined by the left and right side parts coincides with the cross-section formed by the inner walls of the mixer sleeve of a static mixer according to the invention. That is, preferably the longitudinal edges of the left and/or right side part lie in one plane with the upper edges of the respective flow-influencing elements on the front side and/or rear side of the middle part.

In addition, it may be preferred according to the invention if the mixing element further comprises a bottom part with at least one inlet opening, in particular with at least two inlet openings, which is aligned substantially perpendicular to the middle part and/or to the first side part as well as to the second side part. The bottom part may be in the form of a disc or a rectangle, in particular a square, and prevents the components to be mixed from being introduced outside the mixing chambers formed by the flow-influencing elements on the front side and/or rear side of the middle part. In particular, the bottom part can also be formed in the shape of a mixer lid, which is provided for closing a mixer sleeve of a static mixer.

In a particularly preferred embodiment of the present invention, the mixing element, in particular the middle part with the flow-influencing elements and optionally the first and/or second side part and/or the bottom part, is an injection-molded part. Alternatively, the mixing element, in particular the middle part with the flow-influencing elements and optionally the first and/or second side part and/or the bottom part, is produced in a generative, material-building process. In this process, the middle part with the flow-influencing elements and optionally the first and/or second side part and/or the bottom part are preferably formed as one piece of material.

Preferably, the mixing element, in particular the middle part with the flow influencing elements, is made of a material with good sliding properties. This includes in particular a polymeric material with good sliding properties, such as POM (polyoxymethylene), PA (polyamide), PC (polycarbonate), PE (polyethylene), PP (polypropylene), PEEK (polyetheretherketone), PAEK (polyaryletherketone) and/or mixtures of these. In this context, it is particularly preferred according to the invention if the mixing element, in particular the middle part with the flow-influencing elements, is made of POM. Optionally, the aforementioned materials can also be fiber-reinforced. According to the invention, it is therefore further preferred that the mixing element is made of a fiber-reinforced plastic or fiber-reinforced polymeric material or of a fiber-plastic composite. The surface of the mixing element can have a roughness $R_a$ of less than or equal to 2.5 μm, in particular a roughness $R_a$ of less than or equal to 2.0 μm. The roughness $R_a$ is understood as the middle roughness value $R_a$ according to VDI/VDE 3400 and can be determined by means of known measuring methods. Preferably, the roughness $R_a$ is greater than or equal to 0.5 μm, in particular greater than or equal to 1.0 μm to less than or equal to 2.5 μm.

Also an object of the present invention is a static mixer, in particular a dental static mixer for mixing low to high viscosity components, in particular at least two low to high viscosity dental materials comprising a mixing element comprising a flat middle part extending along a longitudinal axis L and having a front side and a rear side opposite to the front side, wherein at least two flow-influencing elements are arranged on the front side and/or on the rear side of the middle part, which elements each enclose at least one passage opening located in the middle part and have the form of prism shells standing substantially perpendicular to the front side and/or the rear side, in particular on the basis of an orthodiagonal quadrilateral, preferably on the basis of a kite quadrilateral, particularly preferably of a rhombus, which overlap or are connected to one another in pairs at one side edge in each case, in particular comprising a mixing element according to the invention, and wherein the static mixer further comprises an elongated mixer sleeve having at least one outlet opening and a mixer lid closing the mixer sleeve and having at least two inlet openings for introducing the components to be mixed, wherein the mixer sleeve is provided for receiving the mixing element and the inner walls of the mixer sleeve as well as the at least two flow-influencing elements on the front side and/or the rear side of the middle part, in particular of the mixing element, form at least two interconnected mixing chambers, in particular rhombic mixing chambers.

The mixing chambers are each formed by the interior space enclosed by flow-influencing elements, in particular the prism shells, which is bounded on one side by the front side and/or the rear side of the middle part and on the other side by the inner walls of the mixer sleeve. Thus, according to the invention, it is preferred if the edge (upper edge) of the respective flow-influencing element, in particular of the prism shell, opposite the front side and/or rear side of the middle part, rests against the respective inner wall of the mixer sleeve, in particular sealingly terminates with the latter. The mixing chambers formed in this way communicate with one another through the common passages at their side edges, which overlap or are connected to one another in pairs, and optionally through the passage openings located in the middle part. The volume of the individual mixing chamber is preferably in the range from greater than or equal to 1 $mm^3$ to less than or equal to 50 $mm^3$, preferably greater than or equal to 10 $mm^3$ to less than or equal to 30 $mm^3$, particularly preferably around 20 $mm^3$.

The mixing chambers formed according to the invention are sealed in that the corresponding component flows must necessarily pass through the mixing chambers along their direction of flow and cannot flow past either laterally or in front of or behind the respective mixing chamber.

The mixer sleeve of the static mixer according to the invention is preferably substantially cylindrical, preferably with a rectangular, in particular a square, cross-section. In this case, the maximum diameter or at least one side length of the cross-section of the cylindrical mixer sleeve can be in the range from greater than or equal to 1 mm to less than or equal to 15 mm, preferably greater than or equal to 5 mm to less than or equal to 10 mm, particularly preferably around 7.5 mm, in particular with +/−1.5 mm. The mixer sleeve thereby preferably comprises at least two cylinder sections, in particular a first cylinder section accommodating the mixing element according to the invention and having a rectangular, in particular square cross-section, and a second cylinder section containing the at least one outlet opening and having a circular cross-section. In this case, the interior spaces bounded by the inner walls, in particular the two opposing inner walls, of the first cylinder section and the flow-influencing elements, as well as the front side and/or rear side of the mixing element, form the respective mixing chambers. At its end opposite the outlet opening, the mixer sleeve has a receiving area, in particular a circular-cylindrical one, for connection to the mixer lid which closes the mixer sleeve.

Preferably, the mixer sleeve and the mixer lid are connected to each other with a precise fit, in particular interlocked with each other. Preferably, the mixer sleeve and the mixer lid are also designed to be rotatable relative to each other. In particular, the mixer sleeve and the mixer lid can be rotated relative to one another despite positive locking. In accordance with the invention, it is particularly preferred if the mixer lid seals the mixer sleeve, in particular by the mixer lid having a circumferential groove in which a sealing lip present on the mixer sleeve can engage when the mixer lid is locked onto the mixer sleeve.

The mixer lid is preferably substantially cylindrical in shape and has a diameter of greater than or equal to 1 mm to less than or equal to 30 mm, preferably greater than or equal to 5 mm to less than or equal to 25 mm, particularly preferably greater than or equal to 10 mm to less than or equal to 20 mm, in particular 18 mm, preferably with +/−1 mm, and a height of greater than or equal to 1 mm to less than or equal to 40 mm, preferably greater than or equal to 10 mm to less than or equal to 30 mm, particularly preferably greater than or equal to 15 mm to less than or equal to 25 mm, in particular 20 mm, preferably +/−1 mm. In this sense, the mixer lid has, viewed from the outside, a circular disc-shaped base plate which has at least two inlet openings for the introduction of the components to be mixed, in particular for the simultaneous introduction of the catalyst paste and the base paste of a dental impression material. The inlet openings are preferably surrounded on the outside by a respective cylindrical receptacle with a correspondingly larger inner diameter, which is provided for the connection of one or more cartridges containing the components to be mixed. Thus, it is preferred if the inner diameter of the inlet openings is in the range from greater than or equal to 0.1 mm to less than or equal to 10 mm, preferably greater than or equal to 1 mm to less than or equal to 8 mm, particularly preferably greater than or equal to 2 mm to less than or equal to 5 mm, and the outer diameter of the receptacle surrounding the inlet openings is in the range from greater than or equal to 0.1 mm to less than or equal to 10 mm, preferably greater than or equal to 2 mm to less than or equal to 7 mm, particularly preferably greater than or equal to 3 mm to less than or equal to 6 mm.

In particular, the mixer lid can also be formed as an integral part of the mixing element or as a component connected to the mixing element, preferably in the form of a base part, so that the mixer sleeve is directly sealed when the mixing element is inserted.

The mixer sleeve and/or the mixer lid are preferably made of an injection-moldable plastic such as polyethylene, polypropylene and/or polystyrene or, in the case of the production of tougher mixtures, of higher-quality plastics, in particular polyamide, polyoxymethylene and/or other impact-resistant polymers or polymer blends.

The height of the static mixer, in particular of the mixer sleeve, preferably including the mixer lid, i.e. measured from the at least two inlet openings located in the mixer lid to the at least one outlet opening of the mixer sleeve, is preferably greater than or equal to 20 mm to less than or equal to 150 mm, preferably greater than or equal to 60 mm to less than or equal to 90 mm, particularly preferably greater than or equal to 70 mm to less than or equal to 80 mm. This small extension of the static mixer in the longitudinal direction avoids, on the one hand, unnecessary shearing of the components to be mixed and, on the other hand, also a restriction of the field of vision during the application of a corresponding impression material in the oral cavity of a patient.

In a preferred embodiment of the static mixer according to the invention, in each case at least one mixing chamber formed on the front side of the middle part, in particular of the mixing element, is connected to in each case at least one mixing chamber formed on the rear side of the middle part, in particular of the mixing element, in particular through at least one passage opening located in the middle part. Preferably, all mixing chambers formed on the front side of the middle part are connected to in each case at least one, in particular to in each case at least two, mixing chamber(s) formed on the rear side of the mixing element and/or all mixing chambers formed on the rear side of the middle part are connected to in each case at least one, in particular to in each case at least two, mixing chamber(s) formed on the front side of the mixing element. In this way, at least part of the component stream located on the front side or rear side of the middle part, in particular of the mixing element, can reach the other side of the middle part and mix with the component stream currently present there.

Finally, a further object of the present invention is the use of a mixing element according to the invention and/or a static mixer according to the invention, in particular a dental static mixer, preferably comprising the mixing element according to the invention, for mixing at least two low- to high-viscosity components. The at least two low- to high-viscosity components are preferably at least two low- to high-viscosity dental materials, in particular 2-component (2C) dental materials, such as 2C-resins or 2C-adhesives. 2C-adhesives, 2C resins are compositions that are mixed for curing from two different components prior to application. In particular, these are at least two pasty dental materials, such as a base paste and a catalyst paste of a 2-component (2C) impression material.

In a preferred embodiment of the use according to the invention, the one low to high viscosity component, in particular the one low to high viscosity dental material, preferably the catalyst paste (cat), is introduced on the front side of the middle part and the other low to high viscosity component, in particular the low to high viscosity dental material, preferably the base paste (base), is introduced on the rear side of the middle part.

In the course of the mixing process, one component (catalyst) is thus first introduced through a first inlet opening into a first mixing chamber at the front of the middle part, and the other component (base) is introduced through a second inlet opening into a first mixing chamber at the rear of the middle part. Thereafter, the mixing of the two components takes place on their way towards the at least one outlet opening by splitting, swirling and recombining the two component streams several times. In this process, the respective component stream, starting from the respective first mixing chamber, is partially directed into the corresponding opposite first mixing chamber on the other side of the middle part and/or partially directed into a second mixing chamber following in the direction of flow on the same side of the middle part, so that the two component streams split longitudinally and transversely after being introduced. This process is repeated again and again in the mixing chambers following in the direction of flow on the front and/or rear side of the middle section as the mixing process continues. In this way, an increasing homogenization of the two components takes place with each further mixing chamber through which they flow, so that they should be completely homogenized when they emerge through the at least one discharge opening and thus when they are discharged, in particular during application.

Figure 1B:
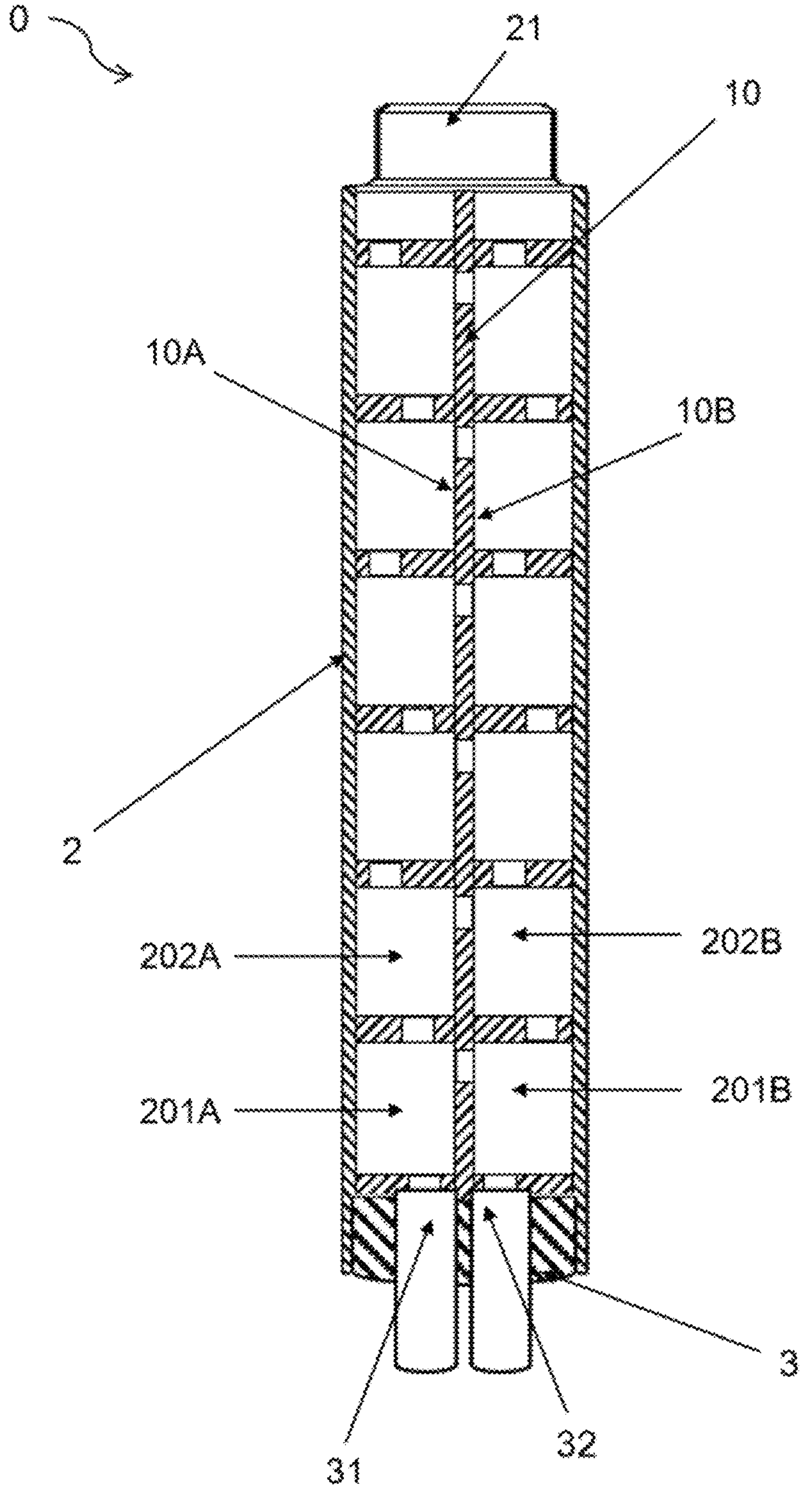

The invention is explained in more detail with reference to the figures, without limiting the invention to these embodiments. Showing:

FIG. 1*a*,1*b*: A static mixer 0 according to the invention with a mixing element 1 according to the invention as well as mixer sleeve 2 and mixer lid 3.

Figure 2:
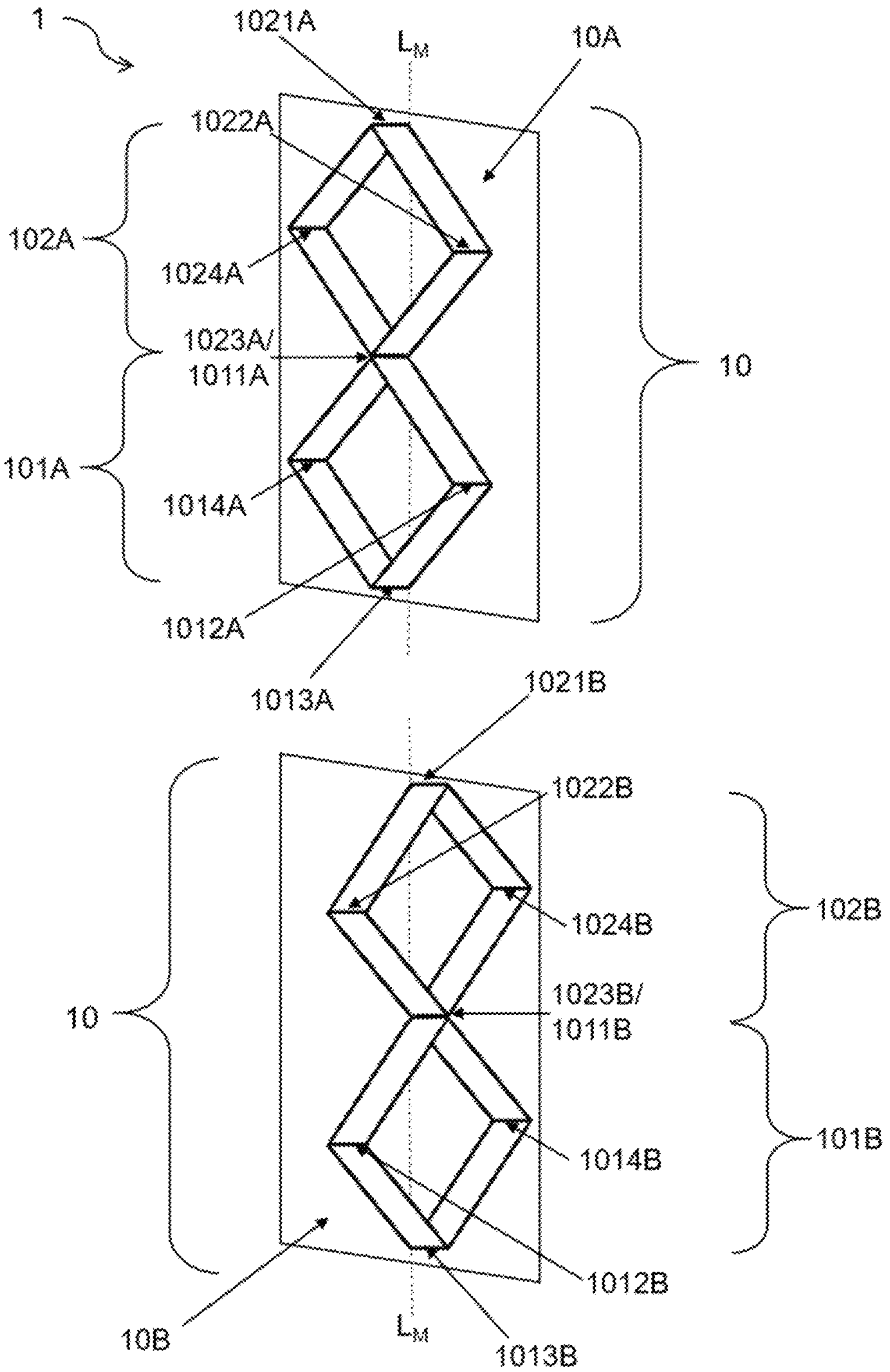

FIG. 2: A section of the front side 10A and the rear side 10B of the middle part 10 of a mixing element 1 according to the invention.

Figure 3:
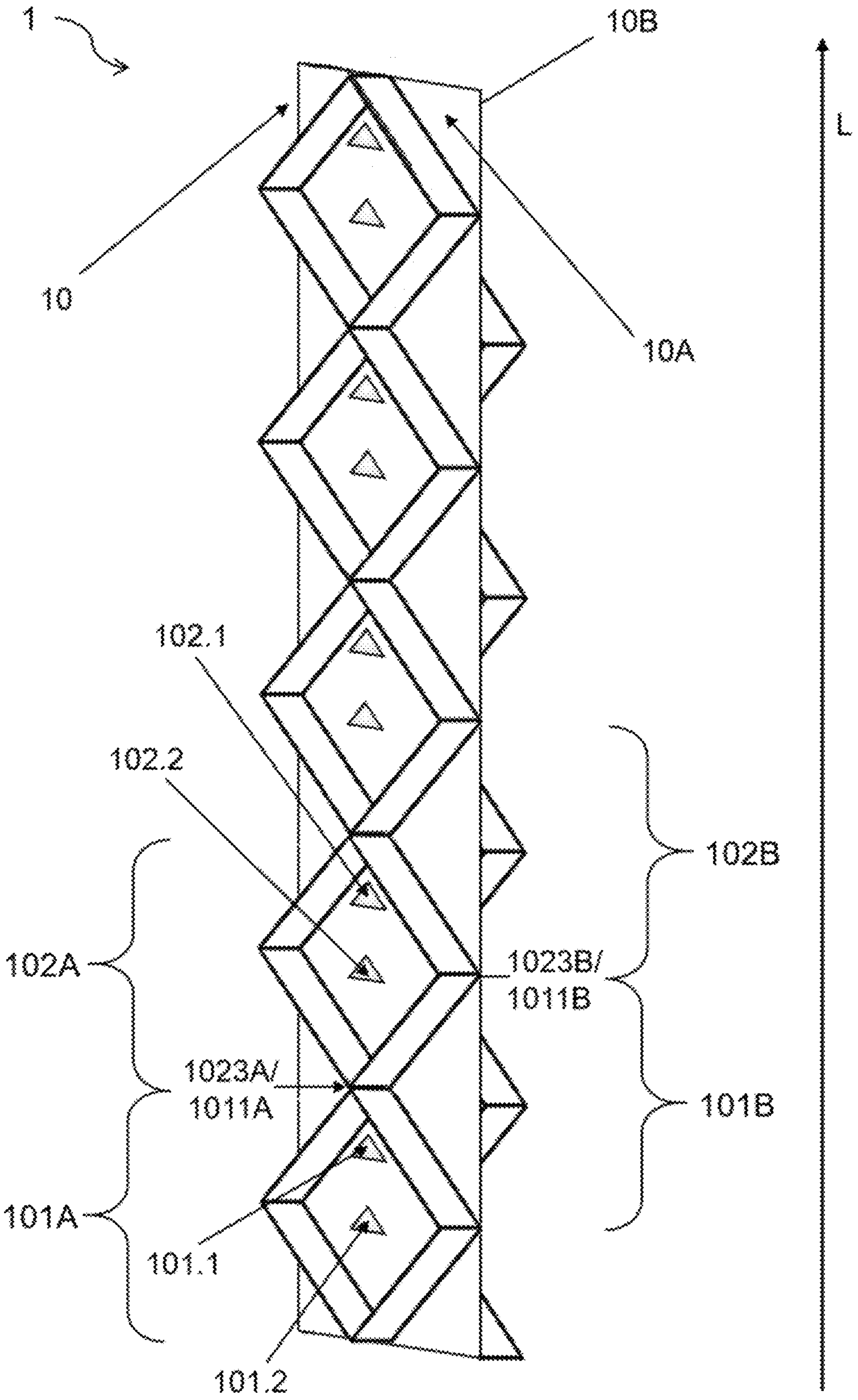

FIG. 3: A mixing element 1 according to the invention in a first embodiment.

Figure 4A:
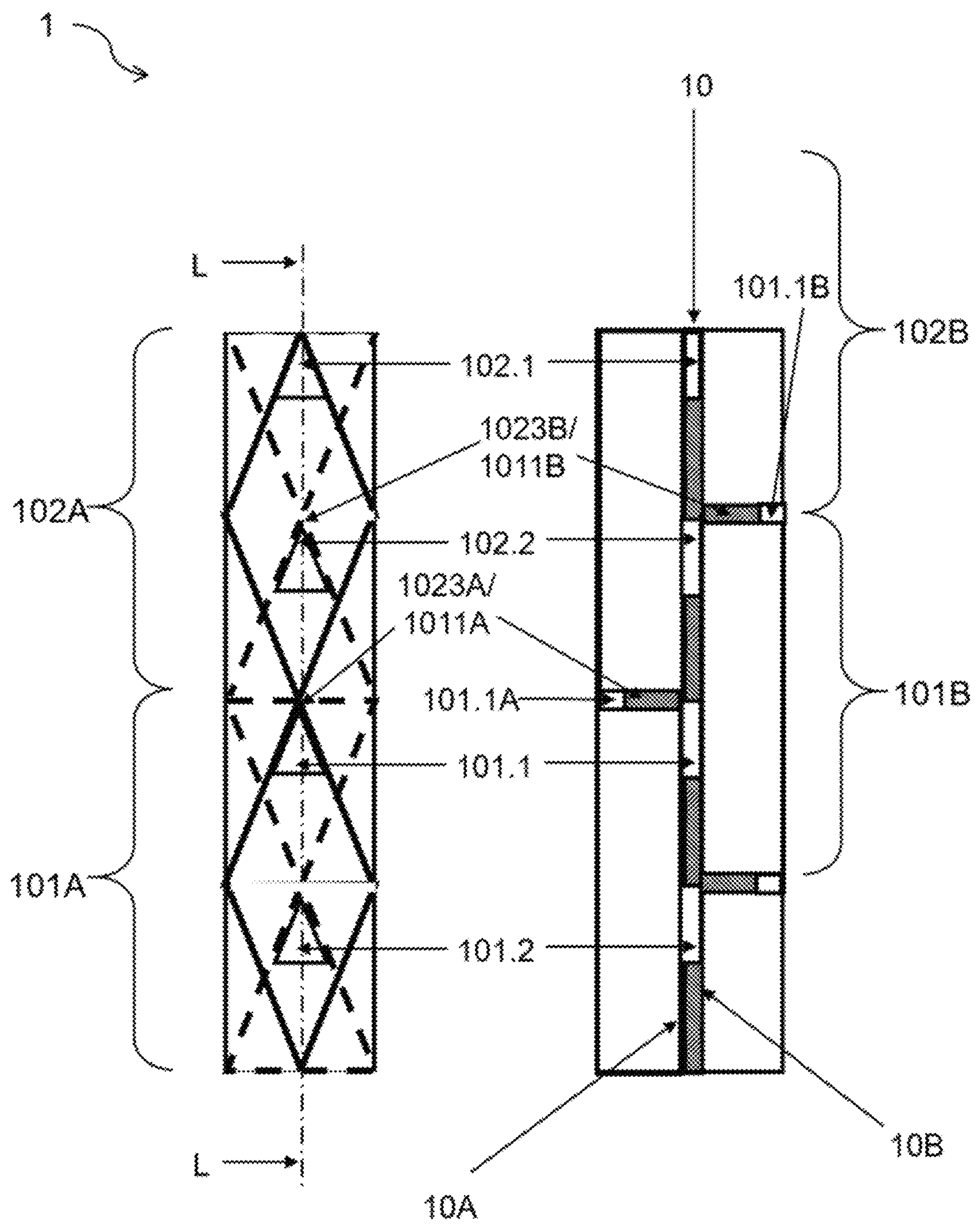
Figure 4B:
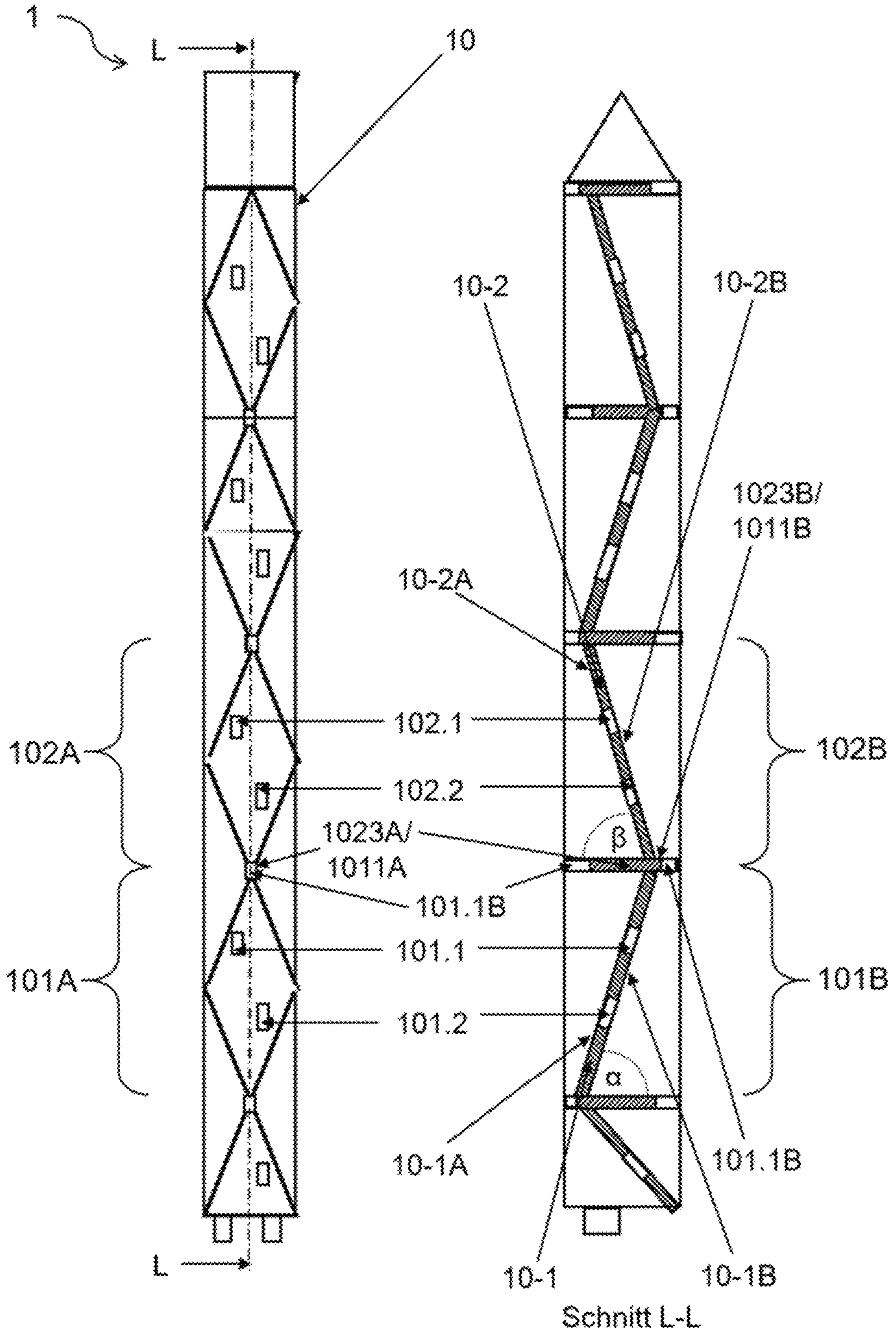

FIG. 4*a*,4*b*: A schematic representation of a mixing element 1 according to the invention.

Figure 5:
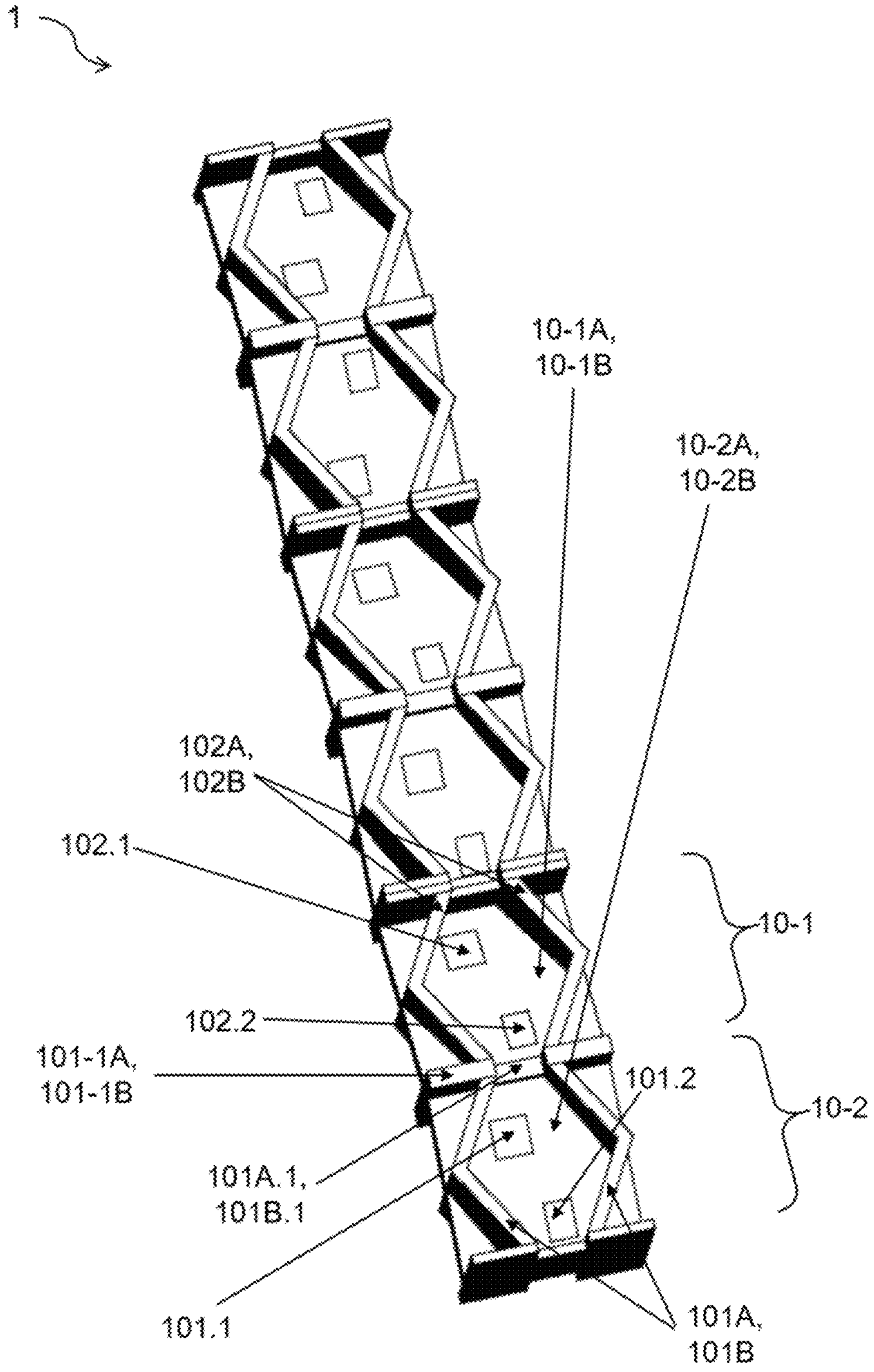

FIG. 5: A mixing element 1 according to the invention in a second embodiment with a middle part composed of middle part segments 10-1, 10-2.

FIGS. 1*a* and 1*b* show a static mixer 0 according to the invention comprising an elongated mixer sleeve 2 and a mixer lid 3 sealingly closing the mixer sleeve 2, as well as a mixing element 1 according to the invention.

FIG. 1*a* shows the individual components of the static mixer 0 separately from one another in external view. The mixing element 1 shown here comprises a middle part 10 with flow-influencing elements arranged thereon, which is aligned perpendicularly to a first side part 11 and to a second side part 12 arranged at a distance from the first side part 11 and connected thereto. Furthermore, the mixing element 1 comprises a bottom part 13 aligned substantially perpendicular to the middle part 10 and to the first side part 11 and second side part 12. The mixing element 1 can be inserted into a lower opening of the mixer sleeve 2 and can be completely accommodated by the latter. At its upper end, the mixer sleeve 2 has a cylindrical outlet opening 21, which is designed for discharging the low- to high-viscosity components to be introduced via the inlet openings 31 and 32 of the mixer lid 3 and homogenized after passing through the mixing element 1. On the outside, the inlet openings 31 and 32 are each surrounded by a cylindrical receptacle for fastening the cartridge(s) containing the respective components.

FIG. 1*b* shows a cross-section through the static mixer 0 shown in FIG. 1*a*, in which the mixing element is arranged in the mixer sleeve 2 closed by the mixer lid 3. In this arrangement, the first and second side parts as well as the upper edges of the flow-influencing elements of the mixing element each lie against two opposite inner walls of the mixer sleeve 2. Thereby, the inner walls of the mixer sleeve 2 as well as the flow-influencing elements on the front side 10A as well as on the rear side 10B of the middle part 10 respectively form at least two front-side mixing chambers 201A, 202A and at least two rear-side mixing chambers 201B, 202B. The front-side mixing chambers 201A, 202A and the rear-side mixing chambers 201B, 202B are respectively connected to each other as well as to each other. Thus, in the course of the mixing process, a component (cat) introduced through the inlet opening 31 on the front side 10A of the middle part 10 and a component (base) introduced through the inlet opening 32 on the rear side 10B of the middle part 10 can be divided, swirled and recombined several times on their way toward the outlet opening 21 and thus optimally homogenized.

FIG. 2 shows a section of a mixing element according to the invention, looking at the front side 10A (top) and the rear side 10B (bottom) of the middle part 10. The section shows two flow-influencing elements arranged on the front side 10A and on the rear side 10B, respectively.

Flow-influencing elements 101A, 102A and 101B, 102B, respectively. The flow influencing elements 101A, 102A, 101B, 102B have the shape of prism shells substantially perpendicular to the front side 10A and the rear side 10B, respectively, based on an orthogonal quadrilateral, in particular a rhombus. Accordingly, each prism shell and thus also each flow-influencing element 101A, 102A, 101B, 102B has four side edges which, in the case illustrated here, are perpendicular to the front side 10A and the rear side 10B, respectively: a respective top first side edge 1011A, 1021A, resp. 1011B, 1021B, a second side edge 1012A, 1022A or 1012B, 1022B lying on the right in each case, a third side edge 1013A, 1023A or 1013B, 1023B lying on the bottom in each case, and a fourth side edge 1014A, 1024A or 1014B, 1024B lying on the left in each case. Thereby, the respective opposite first and third side edges 1011A-1013A, 1021A-1023A and 1011B-1013B, 1021B-1023B, respectively, and thus in particular also the side edges 1011A/1023A and 1011B/1023B, respectively, of the flow-influencing elements 101A, 102A and 101B, 102B, respectively, which overlap or are connected to each other in pairs, are arranged on the longitudinal center axis $L_M$ of the middle part 10.

FIG. 3 shows a first embodiment of a mixing element 1 according to the invention for a static mixer 0. The mixing element comprises a flat middle part 10 extending along a longitudinal axis L and having a front side 10A and a rear side 10B opposite the front side 10A. On both the front side 10A and the rear side 10B, a plurality of flow influencing elements are arranged in the form of prism shells perpendicular to the front side 10A and the rear side 10B, respectively, and composed of rectangular side surfaces on the basis of a rhombus, each of which encloses two triangular passage openings located in the middle part 10. The flow influencing elements 101A, 102A and 101B, 102B on the front side 10A and on the rear side 10B of the middle part 10 are connected to each other in pairs at one side edge 1011A/1023A and 1011B/1023B, respectively. In the process, the flow-influencing elements 101A, 102A located on the front side 10A of the middle part 10 and the flow-influencing elements located on the rear side 10B of the middle part 10 are arranged offset from each other by half a flow-influencing element in the direction of the longitudinal axis L. In the course of this, one of the passage openings 101.1, 102.1 enclosed by the flow-influencing elements 101A, 102A, 102B is formed in each case in the region, in particular at the narrow point, of the side edges 1011A/1023A, which are connected to one another in pairs, of the flow-influencing elements 101A, 102A on the front side 10A of the middle part 10, and the other of the passage openings 101.2, 102.2 are arranged in the region, in particular at the narrow point, of the side edges 1011B/1023B of the flow-influencing elements 101B, 102B, which are connected to each other in pairs, on the rear side 10B of the middle part 10.

FIGS. 4*a* and 4*b* show schematic representations of each embodiment of a mixing element 1 according to the invention.

FIG. 4*a* shows a schematic of a first embodiment of a mixing element 1 according to the invention with a planar shaped middle part 10, wherein a front view is shown on the left side and a sectional view is shown on the right side. In this embodiment, the flow influencing elements 101A, 102A located on the front side 10A of the middle part 10 and the flow influencing elements 101B, 102B located on the rear side 10B of the middle part 10 (shown as dashed lines) are offset from each other by half a flow influencing element. That is, the pairwise overlapping or interconnected side edges 1011A/1023A of the flow influencing elements 101A, 102A on the front side 10A of the middle part 10 are at the level of the respective center of the diamond-shaped flow influencing elements 101B, 102B on the rear side 10B of the middle part 10, and the side edges 1011B/1023B of the flow-influencing elements 101B, 102B, which overlap or are connected to each other in pairs, are arranged on the rear side 10B of the middle part 10 at the level of the respective center of the diamond-shaped flow-influencing elements 101A, 102A on the front side 10A of the middle part 10. The passage openings 101.1, 102.1 and 101.2, 102.2 are thus each located at the end of a mixing chamber formed by the corresponding flow-influencing element 101A, 102A and 101B, 102B on the front side 10A and the rear side 10B, respectively, with respect to the flow path of the components to be mixed, which enables a more efficient division of the component flows due to the backpressure occurring at the transitions of the mixing chambers into one another. In addition, (partial forward flow of the component flows is also possible) since both the front-side flow-influencing elements 101A, 102A and the rear-side flow-influencing elements 101B, 102B are connected to each other at their side edges 1011A/1023A and 1011B/1023B, respectively, which overlap or are connected to each other in pairs, by a common passage 101A.1 and 101B.1, respectively.

FIG. 4*b* shows a schematic of a second embodiment of a mixing element 1 according to the invention with a central part 10 composed of a plurality of central part segments inclined at an angle α to the rear and at an angle β to the front, wherein a front view is shown on the left side and a sectional view is shown on the right side. In this embodiment, a flow influencing member 101A, 102A is arranged on the front side 10-1A, 10-2A of each of a middle part segment 10-1, 10-2, and a flow-influencing element 101B, 102B is arranged on the rear side 10-1B, 10-2B of each of a middle part segment 10-1, 10-2. That is, the flow influencing elements 101A, 102A on the front side 10-1A, 10-2A of the middle part segments 10-1, 10-2 meet each other acutely at their side edges 1011A/1023A which overlap or are connected to each other in pairs, while the flow influencing elements 101B, 102B on the rear side 10-1B, 10-2B of the middle part segments 10-1,10-2 meet each other obtusely at their side edges 1011B/1023B which overlap or are connected to each other in pairs. In this case, the common passage 101A.1 at the pairwise overlapping or interconnected side edges 1011A/1023A of the flow-influencing elements 101A, 102A meeting pointedly with each other is designed to be twice as large as the common passage 101B.1 at the pairwise overlapping or interconnected side edges 1011B/1023B of the flow-influencing elements 101B, 102B meeting obtusely with each other. This increases the flow resistance of the respective component flow in the rear-side mixing chambers tapering with respect to depth, while at the same time allowing easier forward flow of the respective component flow in the front-side mixing chambers expanding with respect to depth. A separation of the component flows into the respective opposite mixing chambers is ensured by the passage openings 101.1, 101.2, 102.1, 102.2 enclosed by the flow-influencing elements 101A, 102A and 101B, 102B, respectively.

FIG. 5 shows the second embodiment of a mixing element 1 according to the invention for a static mixer 0, in which the middle part is composed of several middle part segments which are alternately inclined to the rear and to the front. As on the front sides 10-1A, 10-2A of the middle part segments 10-1, 10-2, also on the rear sides 101B, 10-2B of the middle part segments 10-1, 10-2 there is in each case a flow-influencing element 101A, 102A and 101B, 102B, respectively, in the form of a flow-restricting element perpendicular to the front sides 10-1A, 10-2A and the rear sides 101B, 10-2A, respectively. the rear sides 101B, 10-2B, respectively, composed of trapezoidal side faces and arranged on the basis of a rhombus, which in each case encloses two rectangular through-openings 101.1, 101.2, 102.1, 102.2. The flow influencing elements 101A, 102A and 101B, 102B respectively overlap in pairs at one side edge 1011A/1023A and 1011B/1023B respectively, forming a common passage 101A.1 and 101B.1 respectively, which is stabilized by a crossbar 101-1A and 101-1B respectively arranged between the middle part segments 10-1, 10-2 on the front side 10-1A, 10-2A and the rear side 10-1B, 10-2B respectively. Due to the particular course of the middle part segments, every other one of the mixing chambers formed by the flow influencing elements tapers at its transition into the following mixing chamber not only with respect to its width but also with respect to its depth, as a result of which the flow resistance of a corresponding component flow increases in the axial direction in such a way that a partial flow of the component flow passes through the passage openings enclosed by the flow influencing elements into the opposite mixing chamber and mixes with the component flow located there.

REFERENCE SIGN

0 Static mixer
1 Mixing element, in particular for a static mixer
10 Middle part of mixing element 1
10-1,10-2 Middle part segments of the center section 10
101.1,101.2,
102.1,102.2 Passage openings in the middle part 10
10A Front side of middle part 10
10-1A,10-2A Front side of middle part segments 10-1, 10-2
101A,102A Flow influencing elements on the front side 10A of the middle part 10 and on the front side 10-1A,10-2A of the middle part segments 10-1,10-2, respectively.
101A.1 common passage of the flow influencing elements 101A,102A
1011A,1021A first side edge of flow influencing elements 101A, 102A
1012A,1022A second side edge of flow influencing elements 101A,102A
1013A,1023A third side edge of flow influencing elements 101A,102A
1014A,1024A fourth side edge of flow influencing elements 101A, 102A
101-1A Crossbar on front side 10-1A, 10-2A of middle part segments 10-1,10-2
10B Rear side of middle part 10
10-1B,10-2B Rear side of middle part segments 10-1,10-2
101B,102B Flow influencing elements on the rear side 10B of the middle part 10 and on the rear side 10-1B, 10-2B of the middle part segments 10-1,10-2, respectively.
101B.1 common passage of the flow influencing elements 101B,102B
1011B,1021B first side edge of flow influencing elements 101B,102B
1012B,1022B second side edge of flow influencing elements 101B,102B
1013B,1023B third side edge of flow influencing elements 101B,102B
1014B,1024B fourth side edge of flow influencing elements 101B, 102B
101-1B Crossbar on the rear side 10-1B, 10-2B of the middle part segments 10-1,10-2
11 first side part of mixing element 1
12 second side part of mixing element 1
13 Bottom part of mixing element 1
2 Mixer sleeve of the static mixer 0
21 Outlet opening in the mixer sleeve 2
201A,202A Mixing chambers formed by the inner walls of the mixer sleeve 2 and the front-side flow elements 101A,102A
201B,202B Mixing chambers formed by the inner walls of the mixer sleeve 2 and the front-side flow elements 101A,102A
3 Mixer lid closing the mixer sleeve 2
31,32 Inlet openings in mixer lid 3
L Longitudinal axis
$L_M$ Longitudinal center axis of middle part 10
α Angle at which a middle part segment 101 or 102 is inclined rearward with respect to the longitudinal axis L.
β Angle at which a middle part segment 101 or 102 is inclined forward with respect to the longitudinal axis L.

The invention claimed is:

1. Mixing element (1) for a static mixer (0) for mixing low- to high-viscosity components, comprising a flat middle part (10) extending along a longitudinal axis L and having a front side (10A) and a rear side (10B) opposite the front side (10A), wherein at least two flow influencing elements (101A, 102A, 101B, 102B) are arranged on the front side (10A) and/or on the rear side (10B) of the middle part (10), each of the flow influencing elements (101A, 102A, 101B, 102B) enclosing at least one passage opening (101.1, 101.2, 102.1, 102.2) located in the middle part (10), wherein the flow-influencing elements (101A, 102A, 101B, 102B) having the form of prism shells standing substantially perpendicularly on the front side (10A) and/or the rear side (10B) which overlap or are connected to one another in pairs at a respective side edge (1011A/1023A, 1011B/1023B).

2. Mixing element (1) according to claim 1, wherein the flow influencing elements (101A, 102A,101B, 102B) each having a common passage (101A.1,101B.1) at their side edges (1011A/1023A, 1011B/1023B), which overlap or are connected to each other in pairs.

3. Mixing element (1) according to claim 2, wherein the side edges (1011A/1023A, 1011B/1023B) of the at least two flow influencing elements (101A, 102A, 101B, 102B), which overlap or are connected to each other in pairs, are arranged on the longitudinal center axis LM of the middle part (10).

4. Mixing element (1) according to claim 1, wherein the middle part (10) exhibiting at least two flow influencing elements (101A, 102A) arranged on the front side (10A) and at least two flow influencing elements (101B, 102B) arranged on the rear side (10B), which are at least partially offset from each other in the direction of the longitudinal axis L.

5. Mixing element (1) according to claim 4, wherein the at least two flow-influencing elements (101A, 102A) arranged on the front side (10A) and the at least two flow-influencing elements (101B, 102B) arranged on the rear side (10B) each include at least two through-openings (101.1, 101.2, 102.1, 102.2) located in the middle part (10), wherein the one through-opening (101.1, 102.1) is arranged in the region of the pairwise overlapping or interconnected side edges (1011A/1023A) of the flow-influencing elements (101A, 102A) on the front side (10A) and the other passage opening (101.2, 102.2) is arranged in the region of the pairwise overlapping or interconnected side edges (1011B/1023B) of the flow-influencing elements (101B, 102B) on the rear side (10B).

6. Mixing element (1) according to claim 1, wherein the middle part (10) is composed of at least two middle part segments (10-1, 10-2) which are alternately inclined at an angle α to the rear and at an angle β to the front with respect to the longitudinal axis L, wherein a flow influencing element (101A, 102A, 101B, 102B) is arranged on the front side (10-1A, 10-2A) and/or on the rear side (10-1B/10-2B) of each middle part segment (10-1, 10-2).

7. Mixing element (1) according to claim 6, wherein the angle α is greater than or equal to 1° and less than or equal to 89° and/or the angle β is less than or equal to −1° and greater than or equal to −89° with respect to the longitudinal axis L.

8. Mixing element (1) according to claim 6, wherein the flow influencing elements (101A, 102A, 101B, 102B) on the front side (10-1A, 10-2A) and/or rear side (10-1B, 10-2B) of adjacent middle part segments (10-1, 10-2) alternately meeting each other obtusely or acutely at their side edges (1011A/1023A, 1011B/1023B) overlapping or connected to each other in pairs, wherein the common passage (101A.1) at the pairwise overlapping or interconnected side edges (1011A/1023A) of two flow influencing elements (101A, 102A) meeting each other acutely is larger than the common passage (101B.1) at the pairwise overlapping or interconnected side edges (1011B/1023B) of two flow influencing elements (101B, 102B) meeting each other obtusely.

9. Mixing element (1) according to claim 1, wherein on the front side (10-1A, 10-2A) and/or on the rear side (10-1B, 10-2B) between two middle part segments (10-1, 10-2) in each case there is arranged a crossbar (101-1A and 101-1B, respectively) oriented substantially perpendicular to the longitudinal axis L.

10. Mixing element (1) according to claim 1, wherein the mixing element (1) further comprises a first side part (11) and a second side part (12) arranged at a distance from the first side part (11), and the middle part (10) is connected to the first side part (11) and the second side part (12) in such a way that the front side (10A) and the rear side (10B) are aligned substantially perpendicular to the first side part (11) and/or the second side part (12).

11. Mixing element (1) according to claim 1, wherein the mixing element (1) further comprises a bottom part (13) with at least one opening, which is oriented substantially perpendicular to the middle part (10) and/or to the first side part (11) as well as to the second side part (12).

12. Static mixer (0) for mixing low to high-viscosity components, comprising a mixing element (1) according to claim 1, wherein the static mixer (0) further comprising an elongated mixer sleeve (2) with at least one outlet opening (21) and a mixer lid (3) closing the mixer sleeve (2) and having at least two inlet openings (31, 32) for introducing the components to be mixed, wherein the mixer sleeve (2) is provided for receiving the mixing element (1), and the inner walls of the mixer sleeve (2) and the at least two flow-influencing elements (101A, 102A, 101B, 102B) on the front side (10A) and/or the rear side (10B) of the middle part (10) forming at least two interconnected mixing chambers (201A, 202A, 201B, 202B).

13. Static mixer (0) according to claim 12, wherein at least one mixing chamber (201A, 202A) formed on the front side (10A) of the middle part (10), respectively, is further connected to at least one mixing chamber (201B, 202B) formed on the rear side (10B) of the middle part (10), respectively.

14. Method for mixing at least two low- to high-viscosity components with the mixing element (1) according to claim 1, the method comprising:

- introducing a first low to high viscosity component at or into the front side (10A) of the middle part (10) of the mixing element (1); and
- introducing a second low to high viscosity component at or into the rear side (10B) of the middle part (10) of the mixing element (1).

* * * * *